United States Patent
Hammad et al.

(10) Patent No.: US 9,721,250 B2
(45) Date of Patent: Aug. 1, 2017

(54) LOCATION BASED AUTHENTICATION (75) Inventors: Ayman Hammad, Pleasanton, CA (US); Patrick Faith, Pleasanton, CA (US)

(73) Assignee: Visa U.S.A. Inc., San Francisco, CA (US)

(*) Notice: Subject to any disclaimer, the term of this patent is extended or adjusted under 35 U.S.C. 154(b) by 1203 days.

(21) Appl. No.: 12/258,322

(22) Filed: Oct. 24, 2008

(65) Prior Publication Data

US 2009/0187492 A1 Jul. 23, 2009

Related U.S. Application Data (60) Provisional application No. 60/982,682, filed on Oct. 25, 2007.

(51) Int. Cl.
| | |
|---|---|
| G06Q 20/40 | (2012.01) |
| G06Q 10/08 | (2012.01) |
| G06Q 20/10 | (2012.01) |
| G06Q 20/20 | (2012.01) |
| G06Q 20/32 | (2012.01) |
| G06Q 20/38 | (2012.01) |
| G06Q 30/00 | (2012.01) |

(Continued)

(52) U.S. Cl.
CPC .......... *G06Q 20/40* (2013.01); *G06Q 10/087* (2013.01); *G06Q 20/10* (2013.01); *G06Q 20/102* (2013.01); *G06Q 20/20* (2013.01); *G06Q 20/32* (2013.01); *G06Q 20/3223* (2013.01); *G06Q 20/3274* (2013.01); *G06Q 20/3276* (2013.01); *G06Q 20/387* (2013.01); *G06Q 30/00* (2013.01); *G06Q 30/0212* (2013.01); *G06Q 30/0215* (2013.01); *G06Q 30/0601* (2013.01); *G06Q 40/00* (2013.01); *G06Q 40/025* (2013.01); *G06Q 40/12* (2013.12); *G06Q 40/128* (2013.12); *H04L 63/18* (2013.01)

(58) Field of Classification Search
USPC ............................................ 705/35
See application file for complete search history.

(56) References Cited

U.S. PATENT DOCUMENTS

| 4,423,287 A | 12/1983 | Zeidler |
| 4,578,530 A | 3/1986 | Zeidler |

(Continued)

FOREIGN PATENT DOCUMENTS

| JP | 2002-092320 | 3/2002 |
| KR | 1020070051817 | 5/2007 |

(Continued)

OTHER PUBLICATIONS

U.S. Appl. No. 60/982,682, filed Oct. 25, 2007.

(Continued)

*Primary Examiner* — Leland Marcus
(74) *Attorney, Agent, or Firm* — Kilpatrick Townsend & Stockton LLP (57) ABSTRACT

A portable consumer device that is used to conduct a transaction at a merchant is authenticated. Information provided to a server computer includes locations of a merchant and a mobile communication device possessed by a consumer. If the location of the mobile communication device corresponds to the location of the merchant, the portable consumer device that is used to conduct the transaction is authenticated.

28 Claims, 5 Drawing Sheets

(51) Int. Cl.
*G06Q 30/02* (2012.01)
*G06Q 30/06* (2012.01)
*G06Q 40/00* (2012.01)
*G06Q 40/02* (2012.01)
*H04L 29/06* (2006.01)

(56) References Cited

U.S. PATENT DOCUMENTS

| | | | |
|---|---|---|---|
| 5,650,604 A * | 7/1997 | Marcous et al. | 235/379 |
| 5,745,576 A | 4/1998 | Abraham et al. | |
| 5,761,306 A | 6/1998 | Lewis | |
| 5,878,337 A | 3/1999 | Joao et al. | |
| 5,884,289 A * | 3/1999 | Anderson et al. | 705/44 |
| 5,920,847 A | 7/1999 | Kolling et al. | |
| 5,963,925 A | 10/1999 | Kolling et al. | |
| 6,003,014 A | 12/1999 | Lee et al. | |
| 6,003,763 A | 12/1999 | Gallagher et al. | |
| 6,005,942 A | 12/1999 | Chan et al. | |
| 6,018,717 A | 1/2000 | Lee et al. | |
| 6,097,938 A | 8/2000 | Paxson | |
| 6,105,008 A | 8/2000 | Davis et al. | |
| 6,119,103 A | 9/2000 | Basch et al. | |
| 6,128,391 A | 10/2000 | Denno et al. | |
| 6,179,205 B1 | 1/2001 | Sloan | |
| 6,233,683 B1 | 5/2001 | Chan et al. | |
| 6,240,187 B1 | 5/2001 | Lewis | |
| 6,247,129 B1 | 6/2001 | Keathley et al. | |
| 6,273,335 B1 | 8/2001 | Sloan | |
| 6,282,522 B1 | 8/2001 | Davis et al. | |
| 6,298,336 B1 | 10/2001 | Davis et al. | |
| 6,367,011 B1 | 4/2002 | Lee et al. | |
| 6,370,648 B1 | 4/2002 | Diep | |
| 6,385,595 B1 | 5/2002 | Kolling et al. | |
| 6,402,028 B1 | 6/2002 | Grahan, Jr. et al. | |
| 6,481,632 B2 | 11/2002 | Wentker et al. | |
| 6,560,581 B1 | 5/2003 | Fox et al. | |
| 6,612,488 B2 | 9/2003 | Suzuki | |
| 6,658,393 B1 | 12/2003 | Basch et al. | |
| 6,671,811 B1 | 12/2003 | Diep et al. | |
| 6,678,666 B1 * | 1/2004 | Boulware | 705/66 |
| 6,690,275 B2 * | 2/2004 | Long et al. | 340/525 |
| 6,769,066 B1 | 7/2004 | Botros et al. | |
| 6,808,111 B2 | 10/2004 | Kashef et al. | |
| 6,832,721 B2 | 12/2004 | Fujii | |
| 6,868,391 B1 | 3/2005 | Hultgren | |
| 6,913,194 B2 | 7/2005 | Suzuki | |
| 6,920,611 B1 | 7/2005 | Spaeth et al. | |
| 6,948,656 B2 | 9/2005 | Williams | |
| 7,007,840 B2 | 3/2006 | Davis | |
| 7,039,611 B2 | 5/2006 | Devine | |
| 7,051,923 B2 | 5/2006 | Nguyen et al. | |
| 7,104,444 B2 | 9/2006 | Suzuki | |
| 7,121,456 B2 | 10/2006 | Spaeth et al. | |
| 7,124,937 B2 | 10/2006 | Myers et al. | |
| 7,152,782 B2 | 12/2006 | Shenker et al. | |
| 7,152,788 B2 | 12/2006 | Williams | |
| 7,206,568 B2 | 4/2007 | Sudit | |
| 7,243,853 B1 | 7/2007 | Levy et al. | |
| 7,246,084 B1 | 7/2007 | Javangula et al. | |
| 7,269,737 B2 * | 9/2007 | Robinson | 713/186 |
| 7,280,981 B2 | 10/2007 | Huang et al. | |
| 7,349,871 B2 * | 3/2008 | Labrou et al. | 705/26.35 |
| 7,376,431 B2 | 5/2008 | Niedermeyer | |
| 7,379,916 B1 | 5/2008 | Mizrah | |
| 7,407,094 B2 | 8/2008 | Myers et al. | |
| 7,451,114 B1 | 11/2008 | Matsuda et al. | |
| 7,464,870 B2 | 12/2008 | Nguyen et al. | |
| 7,499,886 B2 | 3/2009 | Matsuda et al. | |
| 7,500,607 B2 | 3/2009 | Williams | |
| 7,503,489 B2 | 3/2009 | Heffez et al. | |
| 7,548,886 B2 | 6/2009 | Kirkland et al. | |
| 7,594,605 B2 | 9/2009 | Aaron et al. | |
| 7,669,759 B1 | 3/2010 | Zettner | |
| 7,669,760 B1 * | 3/2010 | Zettner | 235/382 |
| 7,684,809 B2 | 3/2010 | Niedermeyer | |
| 7,697,942 B2 | 4/2010 | Stevens | |
| 7,743,981 B2 | 6/2010 | Williams | |
| 7,747,535 B2 | 6/2010 | Mikan et al. | |
| 7,752,135 B2 | 7/2010 | Brown et al. | |
| 7,992,777 B1 | 8/2011 | Block et al. | |
| 8,116,731 B2 | 2/2012 | Buhrmann et al. | |
| 8,135,624 B1 | 3/2012 | Ramalingam et al. | |
| 8,140,403 B2 | 3/2012 | Ramalingam et al. | |
| 8,255,284 B1 | 8/2012 | Ramalingam et al. | |
| 8,341,029 B1 | 12/2012 | Ramalingam et al. | |
| 8,374,634 B2 | 2/2013 | Dankar et al. | |
| 8,401,906 B2 | 3/2013 | Ruckart | |
| 2002/0072379 A1 * | 6/2002 | Chen et al. | 455/456 |
| 2002/0108062 A1 | 8/2002 | Nakajima et al. | |
| 2003/0061172 A1 * | 3/2003 | Robinson | 705/67 |
| 2003/0135463 A1 | 7/2003 | Brown et al. | |
| 2003/0135470 A1 | 7/2003 | Beard | |
| 2003/0169881 A1 * | 9/2003 | Niedermeyer | 380/258 |
| 2003/0172040 A1 | 9/2003 | Kemper et al. | |
| 2003/0182207 A1 | 9/2003 | Skinner | |
| 2004/0019522 A1 | 1/2004 | Bortolin et al. | |
| 2004/0050922 A1 | 3/2004 | Gauthier et al. | |
| 2004/0054581 A1 | 3/2004 | Redford et al. | |
| 2004/0073519 A1 | 4/2004 | Fast | |
| 2004/0242201 A1 | 12/2004 | Sasakura et al. | |
| 2005/0027543 A1 * | 2/2005 | Labrou et al. | 705/1 |
| 2005/0065875 A1 | 3/2005 | Beard | |
| 2005/0071226 A1 | 3/2005 | Nguyen et al. | |
| 2005/0071227 A1 | 3/2005 | Hammad et al. | |
| 2005/0071228 A1 | 3/2005 | Bortolin et al. | |
| 2005/0071235 A1 | 3/2005 | Nguyen et al. | |
| 2005/0121506 A1 | 6/2005 | Gauthier et al. | |
| 2005/0171905 A1 * | 8/2005 | Wankmueller et al. | 705/41 |
| 2005/0202830 A1 | 9/2005 | Sudit | |
| 2005/0202831 A1 | 9/2005 | Sudit | |
| 2005/0202832 A1 | 9/2005 | Sudit | |
| 2005/0202834 A1 | 9/2005 | Sudit | |
| 2006/0232398 A1 * | 10/2006 | Nedblake et al. | 340/539.13 |
| 2006/0237531 A1 | 10/2006 | Heffez et al. | |
| 2006/0290501 A1 | 12/2006 | Hammad et al. | |
| 2006/0293027 A1 | 12/2006 | Hammad et al. | |
| 2007/0017970 A1 | 1/2007 | Gauthier et al. | |
| 2007/0034679 A1 | 2/2007 | Gauthier et al. | |
| 2007/0053306 A1 | 3/2007 | Stevens | |
| 2007/0055785 A1 | 3/2007 | Stevens | |
| 2007/0057034 A1 | 3/2007 | Gauthier et al. | |
| 2007/0084913 A1 | 4/2007 | Weston | |
| 2007/0174082 A1 * | 7/2007 | Singh | 705/1 |
| 2007/0250925 A1 | 10/2007 | Levy et al. | |
| 2007/0288375 A1 * | 12/2007 | Talbert et al. | 705/44 |
| 2007/0294182 A1 | 12/2007 | Hammad | |
| 2008/0005037 A1 | 1/2008 | Hammad et al. | |
| 2008/0014964 A1 | 1/2008 | Sudit et al. | |
| 2008/0029593 A1 | 2/2008 | Hammad et al. | |
| 2008/0034221 A1 | 2/2008 | Hammad et al. | |
| 2008/0040271 A1 | 2/2008 | Hammad et al. | |
| 2008/0040275 A1 * | 2/2008 | Paulsen et al. | 705/44 |
| 2008/0040276 A1 | 2/2008 | Hammad et al. | |
| 2008/0065553 A1 | 3/2008 | Faith et al. | |
| 2008/0103982 A1 | 5/2008 | Hammad et al. | |
| 2008/0116264 A1 | 5/2008 | Hammad et al. | |
| 2008/0120236 A1 | 5/2008 | Faith et al. | |
| 2008/0128513 A1 | 6/2008 | Hammad et al. | |
| 2008/0147546 A1 * | 6/2008 | Weichselbaumer et al. | 705/41 |
| 2008/0162346 A1 | 7/2008 | Aaron et al. | |
| 2008/0163257 A1 | 7/2008 | Carlson et al. | |
| 2008/0164308 A1 | 7/2008 | Aaron et al. | |
| 2008/0167980 A1 | 7/2008 | Aaron et al. | |
| 2008/0179394 A1 | 7/2008 | Dixon et al. | |
| 2008/0179395 A1 | 7/2008 | Dixon et al. | |
| 2008/0183565 A1 | 7/2008 | Dixon et al. | |
| 2008/0193622 A1 | 8/2008 | Haedelt et al. | |
| 2008/0201212 A1 | 8/2008 | Hammad et al. | |
| 2008/0203151 A1 | 8/2008 | Dixon et al. | |
| 2008/0203152 A1 | 8/2008 | Hammad et al. | |
| 2008/0203170 A1 | 8/2008 | Hammad et al. | |
| 2008/0208681 A1 | 8/2008 | Hammad et al. | |
| 2008/0222038 A1 | 9/2008 | Eden et al. | |
| 2008/0227471 A1 | 9/2008 | Dankar et al. | |

(56) References Cited

U.S. PATENT DOCUMENTS

| | | |
|---|---|---|
| 2008/0303632 A1 | 12/2008 | Hammad |
| 2008/0314971 A1 | 12/2008 | Faith et al. |
| 2008/0314994 A1 | 12/2008 | Faith et al. |
| 2008/0319889 A1 | 12/2008 | Hammad |
| 2008/0319911 A1 | 12/2008 | Faith et al. |
| 2008/0319912 A1 | 12/2008 | Faith et al. |
| 2009/0012898 A1 | 1/2009 | Sharma et al. |
| 2009/0055319 A1* | 2/2009 | Raheman ............... 705/44 |
| 2009/0078777 A1 | 3/2009 | Granucci et al. |
| 2009/0081990 A1 | 3/2009 | Granucci et al. |
| 2009/0083191 A1 | 3/2009 | Hammad |
| 2009/0088229 A1 | 4/2009 | Hammad et al. |
| 2009/0089213 A1 | 4/2009 | Hammad |
| 2009/0106374 A1* | 4/2009 | Easwar et al. ............ 709/206 |
| 2009/0187492 A1 | 7/2009 | Hammad et al. |
| 2009/0192903 A1 | 7/2009 | Weiss et al. |
| 2009/0204457 A1 | 8/2009 | Buhrmann et al. |
| 2009/0204815 A1 | 8/2009 | Dennis et al. |
| 2009/0328052 A1 | 12/2009 | Nguyen et al. |
| 2010/0006641 A1 | 1/2010 | Boutcher et al. |
| 2010/0006642 A1 | 1/2010 | Boutcher et al. |
| 2010/0023455 A1 | 1/2010 | Dispensa et al. |
| 2010/0049615 A1 | 2/2010 | Rose et al. |
| 2010/0130165 A1 | 5/2010 | Snyder et al. |
| 2010/0138345 A1 | 6/2010 | Lekhtman et al. |
| 2011/0202416 A1 | 8/2011 | Buer et al. |
| 2012/0221392 A1 | 8/2012 | Baker et al. |
| 2012/0259783 A1 | 10/2012 | Kemper et al. |
| 2012/0278172 A1 | 11/2012 | Mercuri et al. |
| 2013/0030934 A1 | 1/2013 | Bakshi et al. |

FOREIGN PATENT DOCUMENTS

| | | |
|---|---|---|
| WO | 2004079499 A2 | 9/2004 |
| WO | 2006135542 A2 | 12/2006 |
| WO | 2009139890 A1 | 11/2009 |
| WO | 2010043722 A1 | 4/2010 |

OTHER PUBLICATIONS

U.S. Appl. No. 12/258,007, filed Oct. 24, 2008.
U.S. Appl. No. 12/257,958, filed Oct. 24, 2008.
U.S. Appl. No. 12/257,179, filed Oct. 23, 2008.
U.S. Appl. No. 12/257,095, filed Oct. 23, 2008.
U.S. Appl. No. 12/257,987, filed Oct. 24, 2008.
U.S. Appl. No. 12/257,212, filed Oct. 23, 2008.
U.S. Appl. No. 12/492,345, filed Jun. 26, 2006.
U.S. Appl. No. 12/492,356, filed Jun. 26, 2006.
U.S. Appl. No. 12/257,958, filed Oct. 24, 2008, 34 pages.
U.S. Appl. No. 12/258,322, filed Oct. 24, 2008.
U.S. Appl. No. 12/492,356, filed Jun. 26, 2009.
U.S. Appl. No. 12/878,877, filed Sep. 9, 2010.
U.S. Appl. No. 12/507,757, filed Jul. 22, 2009.
U.S. Appl. No. 61/297,655, filed Jan. 22, 2010.
U.S. Appl. No. 61/393,753, filed Oct. 15, 2010.
http://www.zumigo.com/product_access.html, Copyright 2010.

* cited by examiner

LOCATION BASED AUTHENTICATION

CROSS-REFERENCES TO RELATED APPLICATIONS

This application claims priority to U.S. Provisional Application No. 60/982,682 filed on Oct. 25, 2007, herein incorporated by reference in its entirety for all purposes.

BACKGROUND

Many consumers use a variety of payment devices when purchasing services and goods. Example payment devices include portable consumer devices such as credit cards, debit cards, prepaid purchase cards and travel cards. Other portable consumer devices include devices that can be used instead of cash to purchase goods or services such as a mobile communication device. To prevent fraud, electronic commerce card associations and/or issuers have instituted authentication systems to ensure that payment devices are only used by authorized cardholders.

Authentication systems could be improved. For example, an issuer may see an authorization request message coming from a merchant, but may have no way to verify that the authentic consumer is actually at the particular merchant. For example, an unauthorized person may have stolen an authentic consumer's payment card and may be using it. The issuer may have no way of knowing if the person who is using the payment card is authentic or not.

Embodiments of the invention address these and other problems.

SUMMARY

Embodiments of the invention are directed to authenticating a portable consumer device that is used to conduct a transaction at a merchant. The portable consumer device is authenticated based on location data coming from at least two different sources. For example, first location information may be received from a mobile communication device possessed by a consumer and second location information may be received from a POS terminal operated by a merchant conducting the transaction. If the first location information and the second location information correspond to each other (e.g., they match), then the server computer may authenticate the transaction. In some embodiments, the mobile communication device may be the portable consumer device. In other embodiments, the mobile communication device may be separate from the portable consumer device. For example, the portable consumer device could be a payment card.

These and other embodiments of the invention are described in further detail below.

DETAILED DESCRIPTION

Some embodiments of the invention are directed to authenticating a consumer or a portable consumer device that is used to conduct a transaction at a merchant. In embodiments of the invention, location information is received from at least two sources. The location information is used to verify that the consumer is at the same location that the transaction is being conducted. For example, the portable consumer device can be authenticated based on the locations of a mobile communication device and the merchant. In some embodiments, the portable consumer device may be a payment card, while in other embodiments the portable consumer device may be the mobile communication device.

In one example embodiment, the portable consumer device is a payment card. After a transaction is initiated with the payment card, the payment card interacts with a point of sale (POS) terminal. The POS terminal may send an authorization request message to the issuer of the payment card via an acquirer and a payment processing network. A server in the payment processing network may also determine the location of a mobile phone possessed by the consumer. If the merchant location information and the location information from the mobile phone match, then the server computer may determine that the transaction is authentic. If the merchant location information and the location information do not match, then the server computer may not consider the transaction authentic. The server computer may thereafter forward the authorization request message to the issuer with an indicator that it has determined that the consumer has been authenticated or that the consumer has not been authenticated. If the issuer determines that the consumer has sufficient funds or credit in the account associated with the portable consumer device, the issuer may decide to authorize the transaction if the consumer was authenticated. Alternatively, the issuer may decline the transaction because the consumer was not authenticated.

In some embodiments, instead of having a merchant send information to the issuer via the acquirer, the mobile communication device (or a payment application stored on the mobile communication device) may interact directly with the payment processing network. In some embodiments, the mobile communication device may translate any information received from the merchant so that the payment processing network may process and transmit the information to an issuer. In this example, it is not necessary for the acquirer to receive an authorization request message before the payment processing network receives it.

In such embodiments, the mobile communication device may also communicate directly with a point of sale (POS) terminal and may gather information from the merchant (or vice versa) before sending the information directly to the payment processing network. The payment processing network may thereafter send an authorization request message or other appropriate information to the issuer so that the issuer can make a decision regarding whether or not to authorize the transaction.

During the transaction process, the merchant may provide location information to the mobile communication device. For example, the location information may include a unique merchant identifier that identifies the location of the merchant. The mobile communication device then provides the location information to the payment processing network. A global positioning system (GPS) associated with the mobile communication device may also be used to identify the location of the mobile communication device. The location of the mobile communication device may then be provided to the payment processing network.

The payment processing network can determine that the mobile communication device is authentic if the merchant location corresponds to the GPS location of the mobile communication device. For example, when the mobile communication device is identified as being in the same location as the merchant, the payment processing network processes the transaction. Likewise, when the mobile communication device is identified as being at a different location from the merchant (e.g., in a different postal code), the payment processing network does not process the transaction.

In one illustrative example, a consumer conducts a transaction using her mobile phone at a retail outlet in San Francisco. Before the transaction is conducted, the consumer authenticates herself to the payment processing network using the mobile phone. The merchant provides location information to the consumer's mobile phone. The location information may include the merchant location or a merchant identifier that may be used by the payment processing network to identify the merchant's location. The location of the mobile phone may be identified by a global positioning system. Thus, if the GPS location of the mobile phone corresponds to the merchant location, the payment processing network considers the transaction to be valid and processes the transaction.

In another illustrative example, the payment processing network may use the location information from one transaction to determine that a different transaction is not authentic. Specifically, the other transaction may be conducted on the same day as and at a different merchant location from the previous transaction. For example, the same consumer may be identified as initiating a transaction using a different portable consumer device (e.g., a credit card) at a merchant in Los Angeles less than an hour after the retail transaction was conducted in San Francisco. Since it is nearly impossible for one person to be in Los Angeles less than an hour after being in San Francisco, one of the portable consumer devices is not authentic. Based on the GPS location of the mobile phone and since the user already authenticated herself to the payment processing network in San Francisco, the payment processing network would not recognize as valid the credit card transaction at the merchant in Los Angeles.

Some embodiments of the present invention can be used with standard payment processing systems. An exemplary payment processing system is described in further detail below.

Figure 1:
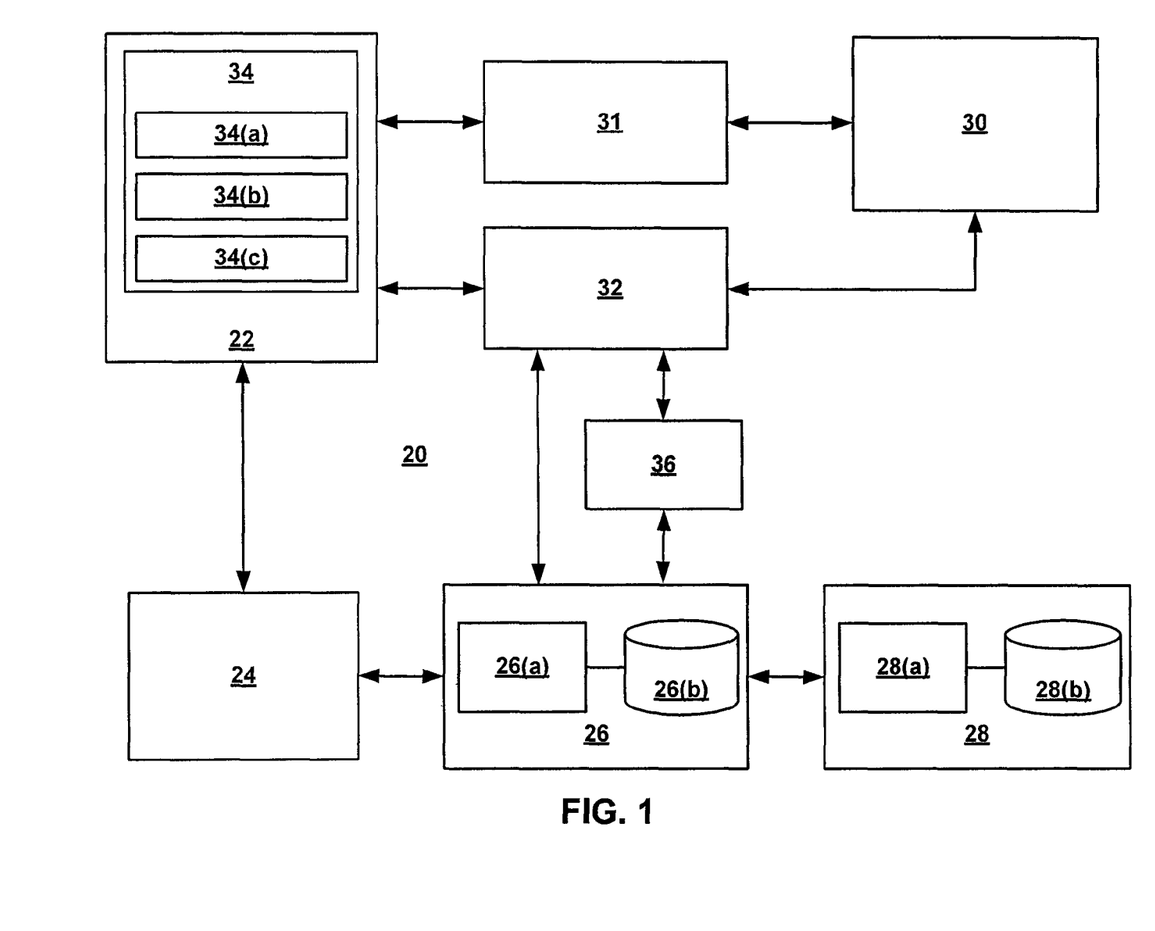
FIG. 1 shows a payment processing system that can be used in an embodiment of the invention.

FIG. 1 shows a payment processing system 20 that can be used in embodiments of the present invention. The system 20 includes a merchant 22 and an acquirer 24 associated with the merchant 22. In a typical payment transaction, a consumer 30 may purchase goods or services at the merchant 22 using a portable consumer device such as a mobile communication device 32 or a payment card 31 that is configured to facilitate a payment transaction with the merchant 22. The acquirer 24 can communicate with an issuer 28 via a payment processing network 26. The payment processing network 26 may include a server computer 26(a), and a database 26(b) operatively coupled to the server computer 26(a). The server computer 26(a) may comprise a processor and a computer readable medium coupled to the processor. The computer readable medium may comprise code for receiving first location information associated with a particular location; code for receiving second location information associated with the particular location; and code for determining that a portable consumer device is authentic when the first location information corresponds to the second location information. The database 26(b) may comprise information including a lookup table which correlates merchant identifiers with specific geographic locations. For example, a merchant identifier 12389 may correspond to a geographic location of a vendor such as Acme Food, at 1 Brown Street, San Francisco, Calif.

The acquirer 24 is typically a bank that has a merchant account. The issuer 28 may also be a bank, but could also be a business entity such as a retail store. Some entities are both acquirers and issuers, and embodiments of the invention include such entities. The issuer 28 may also operate a server computer 28(a), which may have a computer readable medium comprising code for performing the functions that the issuer 28 performs. A database 28(b) comprising account information and other information may be operatively coupled to the server computer 28(a).

The consumer 30 may be an individual, or an organization such as a business that is capable of purchasing goods or services.

Although portable consumer devices in the form of phones and cards have been described above, portable consumer devices may have other forms. For example, suitable portable consumer devices may also include PDAs, mobile computers, key fobs, etc.

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a Visa Integrated Payments (VIP) system which processes authorization requests and a Base II system which performs clearing and settlement services.

The payment processing network 26 may include a server computer 26(a) and a database 26(b) operatively coupled to the server computer 26(a). A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

A global positioning system (GPS) 36 can be coupled to the payment processing network 26 and the mobile communication device 32. Location information from the global positioning system 36 can be used to authenticate the portable consumer device being used based on the location of the mobile communication device 32 and the location of the merchant 22. As those having ordinary skill in the art would appreciate, any mobile communication device may be provided with a GPS receiver to identify the location of the mobile communication device.

The merchant 22 may also have, or may receive communications from, an access device 34 that can interact with the payment card 31 and/or the mobile communication device 32. In FIG. 1, the access device 34 is located at the merchant 22.

The access devices according to embodiments of the invention can be in any suitable form. Examples of access devices include point of sale (POS) devices, cellular telephones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If the access device 34 is a POS terminal, any suitable POS terminal may include a reader 34(*a*), a processor 34(*b*) and a computer readable medium 34(*c*). The reader 34(*b*) may include any suitable contact or contactless mode of operation. For example, exemplary card readers can include radio frequency (RF) antennas, magnetic stripe readers, etc., to interact with the portable consumer device 32.

In an embodiment of the invention, the consumer 30 purchases a good or service at the merchant 22 using the mobile computing device 32 or the payment card 31. The mobile portable computing device 32 or the payment card 31 can interact with the access device 34 such as a POS terminal at the merchant 22. For example, the consumer 30 may initiate a transaction by causing either the payment card 31 or the mobile communication device 32 to pass by the reader 34(*b*) of the access device 34 so that the access device 34 can read information from the payment card 31 or the mobile communication device 32.

The access device 34 can then generate an authorization request message. The authorization request message may include information such as the transaction amount, a merchant identifier, CVV (card verification value), PAN (primary account number), and other information. The authorization request message is then forwarded to the acquirer 24. After receiving the authorization request message, the authorization request message is then sent to the server computer 26(*a*) in the payment processing network 26.

At some point in time, the mobile communication device 32 can send its location information directly to the server computer 26(*a*) in the payment processing network 26, or the GPS system 36 may send the mobile communication device location information to the server computer 26(*a*) in the payment processing network 26.

The server computer 26(*a*) in the payment processing network 26 can then determine if the portable consumer device and/or the consumer is authentic. The server computer 26(*a*) can compare the location information received from the mobile communication device 32 with the location of the merchant 22. The server computer 26(*a*) may determine the location of the merchant 22 by determining a physical address or geographic coordinates that correspond to the merchant identifier received in the authorization request message. If the location information received from the two different sources matches, then the server computer 26(*a*) can determine that the transaction is authentic. If the location information received from the two different sources does not match, then the server computer 26(*a*) can determine that the transaction is not authentic. For example, if the merchant is located in Los Angeles, and the location of the mobile communication device 32 is in New York, then the server computer 26(*a*) may determine that the consumer 30 or the portable consumer device is not authentic. Alternatively, the server computer 26(*a*) may call the consumer 30 on the mobile communication device 32 and may attempt to authenticate the consumer 30 using challenge questions or the like.

The payment processing network 26 may then forward the authorization request message including its determination as to whether or not the transaction is authentic to the issuer 28.

After the issuer 28 receives the authorization request message, the issuer 28 sends an authorization response message back to the payment processing network 26 to indicate whether or not the current transaction is authorized (or not authorized). For example, the transaction may not be authorized if there are insufficient funds or credit in the consumer's account. In another example, the issuer 28 may receive information that the server computer 26(*a*) in the payment processing network 26 has determined that the received location information did not match. The issuer 28 may thereafter determine that the transaction is too risky and the issuer 28 may thereafter decline to authorize the transaction. The payment processing network 26 then forwards the authorization response message back to the acquirer 24. The acquirer 24 then sends the response message back to the merchant 22.

The response message that is sent back to the merchant 22 may include an indication as to whether the server computer 26(*a*) determined that the location information from the two different sources matched. In some embodiments, the payment processing network 26 could alternatively send its authentication determination information to the merchant 22 before or after this information is sent to the issuer 28.

It is noted that in other embodiments, the issuer 28, instead of the payment processing network 26, could perform the authentication process described above.

After the merchant 22 receives the authorization response message, the access device 34 at the merchant 22 may then provide the authorization response message for the consumer 30. The response message may be displayed by the access device 34, or may be printed out on a receipt.

At the end of the day, a normal clearing and settlement process can be conducted by the payment processing network 26. A clearing process is a process of exchanging financial details between the acquirer 24 and the issuer 28 to facilitate posting to a consumer's account and reconciliation of the consumer's settlement position.

In the transaction flow that is described above, the authorization request message passes from the merchant 22 to the issuer 28 via the payment processing network 26 and the acquirer 24. In other embodiments, transaction information may pass from the merchant 22 to the issuer 28 via the mobile communication device 32 and the payment processing network 26, without passing through the acquirer 24. Specifically, rather than providing authorization through the merchant 22 and the acquirer 24, embodiments of the invention may use the mobile communication device 32 to pass information from the merchant 22 to the server computer 26(*a*) in the payment processing network 26. The mobile communication device 32 may translate any information received from the merchant 22 so that the server computer 26(*a*) in the payment processing network 26 may process and transmit the information to the issuer 28.

In such embodiments, the mobile communication device 32 may communicate directly with the access device 34 at the merchant 22 and may gather information from the merchant 22 (or vice versa) before sending the information directly to the payment processing network 26. For example, the merchant 22 may sign a transaction and may send an electronic signature to the mobile communication device 32, and the mobile communication device 32 may forward the electronic signature and other transaction information to the payment processing network 26. In some embodiments, the merchant's POS terminal may receive an identifier such as a verification value, a phone number, or a SIM card number from the mobile communication device 32. The POS terminal may then return this information to the mobile communication device 32 along with a merchant identifier or a POS terminal identifier. This information may be sent to the payment processing network 26 directly via the mobile communication device 32 as evidence that the mobile communication device 32 and the POS terminal were interacting during the transaction.

In some embodiments, before a transaction is initiated at the merchant 22, the consumer 30 can authenticate himself to the mobile communication device 32. The consumer 30 may authenticate himself to the mobile communication device 32 in a variety of different ways. Exemplary authentication mechanisms for a mobile communication device include entering a personal identification number (PIN) or entering a challenge response into the mobile communication device 32, or any other method of verifying the consumer's identity at the mobile communication device 32.

After the consumer 30 authenticates himself to the mobile communication device 32, the mobile communication device 32 may be used to initiate a transaction at the merchant 22. For example, the consumer 30 may select goods to purchase at the merchant 22. The consumer may pay for the goods at a POS terminal using the mobile communication device 32. During the transaction process, the merchant 22 provides location information to the mobile communication device 32. For example, the location information may include a unique merchant identifier that is used to identify the location of the merchant 22. The merchant identifier may be in the form of a physical address or may be in the form of a code associated with a physical address that may be stored in the database 26(b) in the payment processing network 26. The mobile communication device 32 then provides the location information to the payment processing network 26. The global positioning system 36 may be used to identify the location of the mobile communication device 32 and to provide the GPS location of the mobile communication device 32 to the payment processing network 26. Alternatively, the mobile communication device 32 may transmit location information directly to the payment processing network 26.

As in the prior embodiments, the payment processing network 26 can determine that the mobile communication device 32 is authentic when the merchant location corresponds to the GPS location of the mobile communication device 32. Conversely, when the mobile communication device 32 is identified as being at a different location from the merchant 22 (e.g., in a different postal code or in a different city), the payment processing network 26 can determine that the mobile communication device 32 being used and/or the consumer is not authentic.

In some embodiments, the payment processing network 26 may use the merchant and mobile communication device location information associated with a transaction to deny authentication of a subsequent transaction. For example, a consumer may be identified as initiating a transaction using a different payment device (e.g., a debit card) at a different merchant less than ten minutes after a previous transaction was conducted in a different time zone using the mobile communication device 32. Based on the GPS location of the mobile communication device 32 and since the user already authenticated herself to the payment processing network 26 for the previous transaction, the payment processing network 26 would not authenticate the debit card transaction due to the high probability that the debit card transaction is fraudulent.

Figure 2:
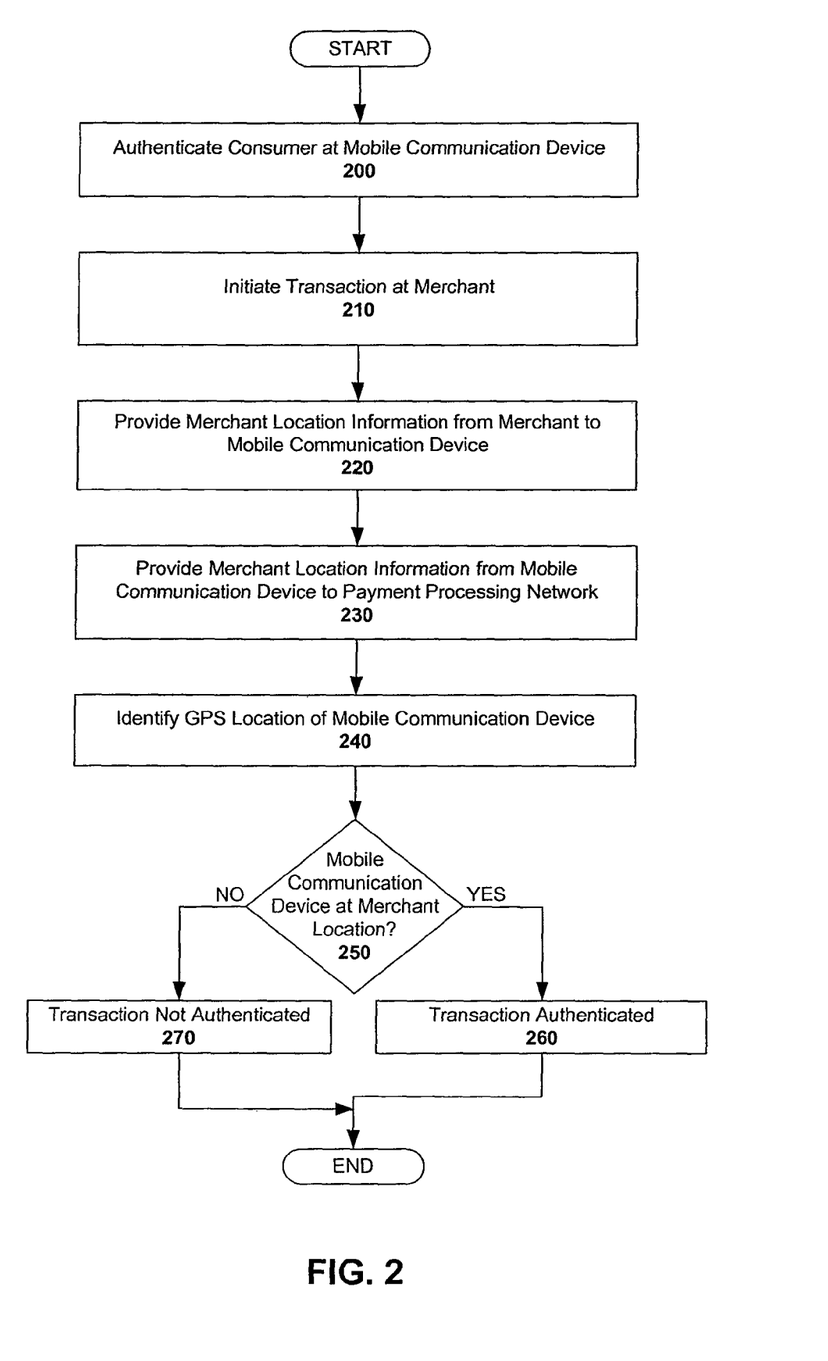
FIG. 2 is a flow diagram illustrating a method for authenticating a mobile communication device based on locations of the mobile communication device and a merchant where the portable consumer device is conducting a transaction in accordance with embodiments of the present invention.
Figure 3:
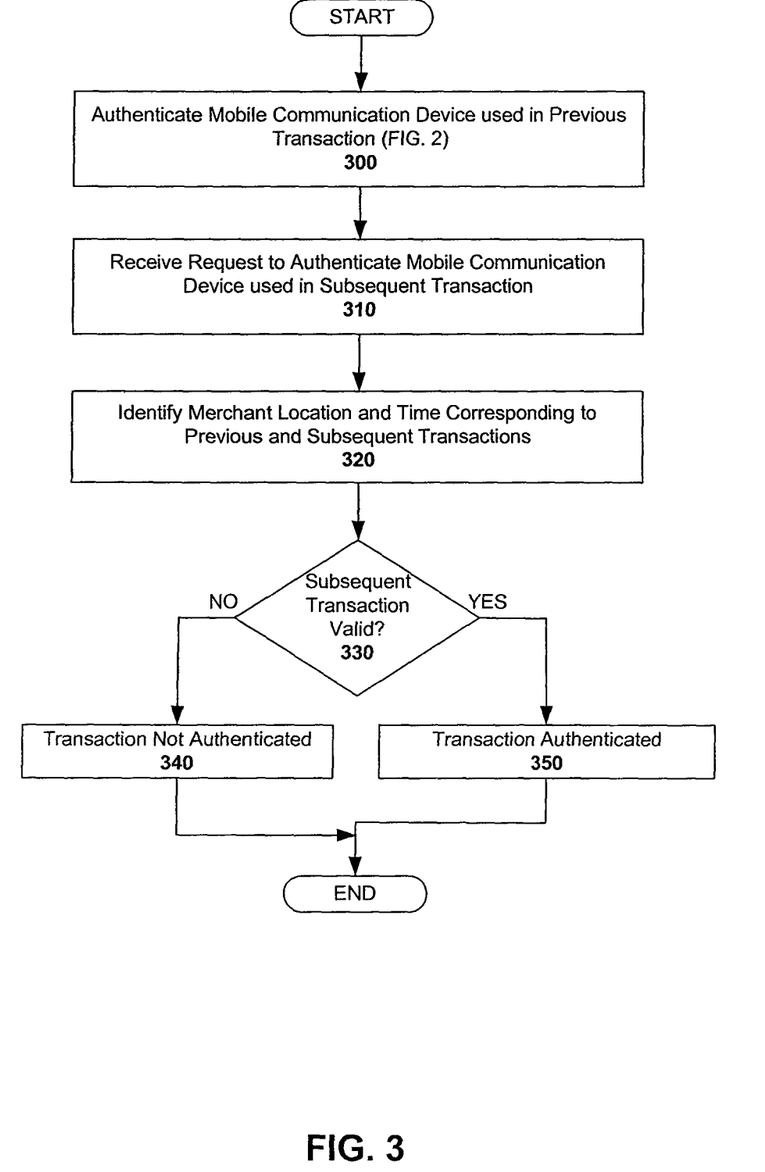
FIG. 3 is a flow diagram illustrating a method for denying authentication of a mobile communication device conducting a subsequent transaction based on authentication of a different mobile communication device used in a previous transaction in accordance with embodiments of the present invention.

FIGS. 2 and 3 are flow diagrams illustrating some specific embodiments.

FIG. 2 is a flow diagram illustrating a method for authenticating a mobile communication device based on locations of the mobile communication device and a merchant where the consumer is conducting a transaction.

Before the consumer initiates the transaction, the consumer authenticates himself to the mobile communication device (step 200). The consumer may authenticate himself to the mobile communication device in a variety of different ways. Exemplary authentication mechanisms include entering a personal identification number (PIN), entering a challenge response or by any other method of verifying consumer identity to the mobile communication device.

After the consumer authenticates himself to the mobile communication device, the mobile communication device or a payment card is used to initiate the transaction at the merchant (step 210). For example, the consumer may select goods to purchase at the merchant. The consumer may pay for the goods at a POS terminal using the mobile communication device. During the transaction process, the POS terminal generates transaction information. The transaction information may include the time of the transaction, a description of the goods purchased during the transaction, the cost of the goods, the location of the merchant, and the like.

The merchant provides the merchant location information to the mobile communication device (step 220). The merchant location information may identify the location of the merchant or may include a unique merchant identifier that is used by the payment processing network to identify the merchant location.

The mobile communication device provides the merchant location information to the payment processing network (step 230). Thus, the payment processing network may identify the merchant location where the transaction was initiated by the mobile communication device.

The location of the mobile communication device is identified using a global positioning system (step 240). The global positioning system provides the GPS location of the mobile communication device to the payment processing network.

A determination is made whether the GPS location of the mobile communication device corresponds to the merchant location (step 250). The payment processing network considers the mobile communication device to be authentic when the merchant location corresponds to the GPS location of the mobile communication device. For example, when the mobile communication device is identified as being in the same location as the merchant, the payment processing network authenticates the transaction (step 260).

The payment processing network may determine that the mobile communication device is not authentic when the merchant location does not correspond to the GPS location of the mobile communication device. For example, when the mobile communication device is identified as being at a different location from the merchant (e.g., in a different postal zone), the payment processing network does not process the transaction because the transaction is not authentic (step 270). Authentication processing may then terminate, or may proceed in another manner (e.g., a phone call may be made to the mobile communication device).

FIG. 3 is a flow diagram illustrating a method for denying authentication of a mobile communication device conducting a subsequent transaction based on authentication of a different mobile communication device used in a previous transaction. A mobile communication device used in a previous transaction conducted at a merchant is authenticated as described above with reference to FIG. 2 (step 300). Thus, the consumer is verified as being at the merchant location at the time the previous transaction was initiated and completed.

The payment processing network receives a request to authenticate a mobile communication device used in a subsequent transaction (step 310). The subsequent transaction may be initiated at a different merchant than the previous transaction.

The payment processing network identifies the merchant location and time of the previous transaction and the subsequent transaction (step 320). For example, the same consumer may be identified as initiating a transaction using a different mobile communication device (e.g., a credit card) at a merchant in a different part of the country less than two hours after the previous transaction was processed.

A determination is made whether the subsequent transaction is valid based on the time and merchant location of each of the previous and subsequent transactions (step 330).

In the event that the subsequent transaction is initiated at a time and/or location that is impossible to attain in view of the time and merchant location of the previous transaction, the transaction is not authenticated and the payment processing network does not process the subsequent transaction (step 340). For example, a subsequent transaction would not be considered as valid at a merchant that is 200 miles from the merchant location of the previous transaction and the previous transaction took place less than thirty minutes prior to receiving the request to authenticate the mobile communication device used to initiate the subsequent transaction. Based on the consumer's verified presence at the merchant location for the previous transaction, the payment processing network would not process the subsequent transaction because it is highly likely that the subsequent transaction is fraudulent.

In the event that the subsequent transaction is initiated at a time and/or location that is likely valid in view of the time and merchant location of the previous transaction, the transaction is authenticated and processed (step 350). For example, a subsequent transaction would be considered valid at a merchant that is in the same postal zone as the merchant location of the previous transaction and the previous transaction took place more than four hours prior to the initiation of the subsequent transaction.

Figure 4:
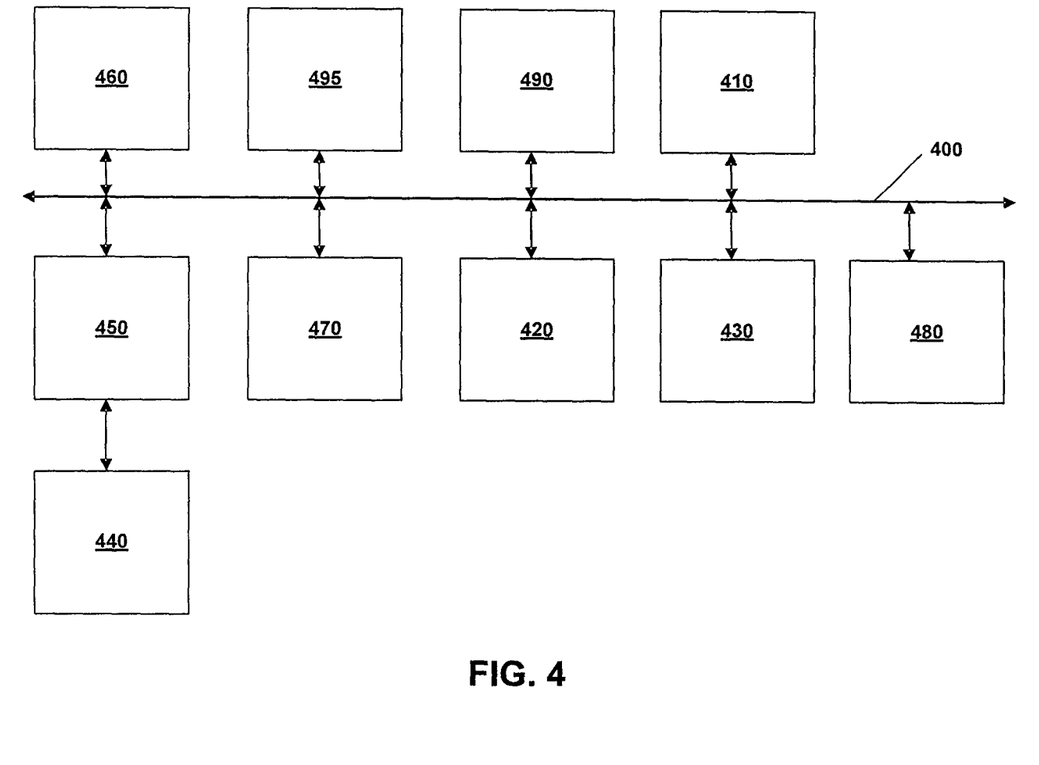
FIG. 4 shows typical components or subsystems of a computer apparatus.

FIG. 4 shows typical components or subsystems of a computer apparatus. Such components or any subset of such components may be present in various components shown in FIG. 1, including the access device 34, server computers 26(a), 28(a), etc. The subsystems shown in FIG. 4 are interconnected via a system bus 400. Additional subsystems such as a printer 410, keyboard 420, fixed disk 430, monitor 440, which is coupled to display adapter 450, and others are shown. Peripherals and input/output (I/O) devices, which couple to I/O controller 460, can be connected to the computer system by any number of means known in the art, such as serial port 470. For example, serial port 470 or external interface 480 can be used to connect the computer apparatus to a wide area network such as the Internet, a mouse input device, or a scanner. The interconnection via system bus 400 allows the central processor 490 to communicate with each subsystem and to control the execution of instructions from system memory 495 or the fixed disk 430, as well as the exchange of information between subsystems. The system memory 495 and/or the fixed disk 430 may embody a computer readable medium.

Figure 5:
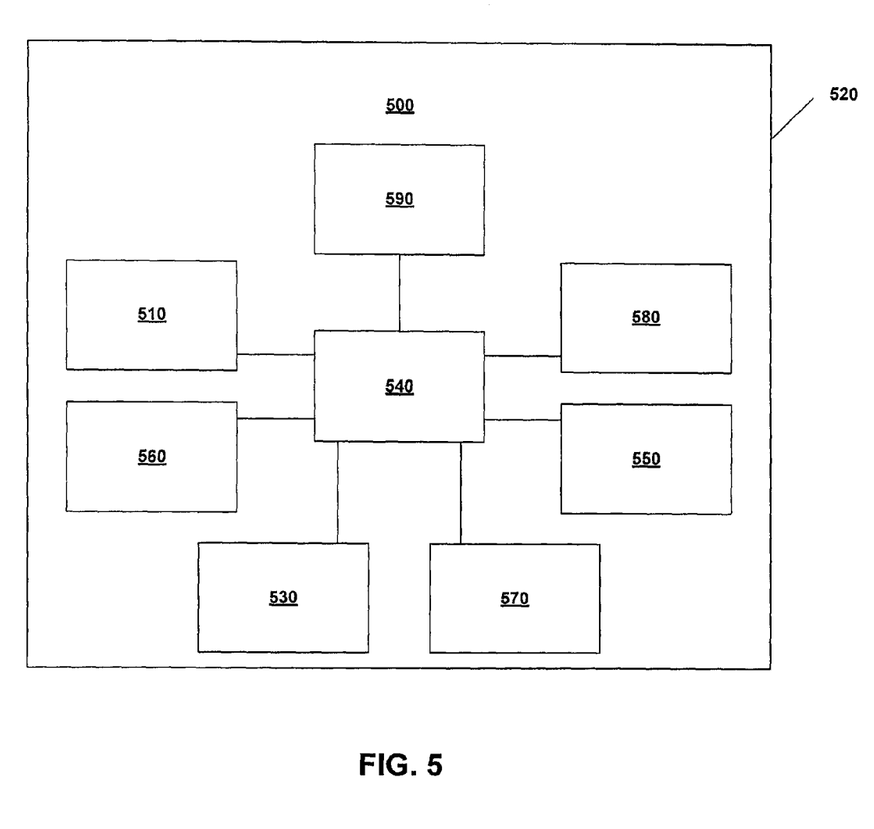
FIG. 5 shows a block diagram of some components of a mobile communication device that may be used as a payment device.

FIG. 5 shows a block diagram of some components of a mobile communication device 500. The mobile communication device 500 may comprise a computer readable medium 510 and a body 520. The computer readable medium 510 may be present within the body 520, or may be detachable from it. The body 520 may be in the form of a plastic substrate, housing, or other structure. The computer readable medium 510 may be a memory that stores data and may be in any suitable form including a magnetic stripe, a memory chip, etc. The computer readable medium 510 may comprise code for receiving first location information associated with a particular location, code for receiving second location information associated with the particular location, and code for determining that a portable consumer device is authentic when the first location information corresponds to the second location information.

The mobile communication device 500 may further include a contactless element 530, which is typically implemented in the form of a semiconductor chip (or other data storage element) with an associated wireless transfer (e.g., data transmission) element, such as an antenna. Data or control instructions transmitted via a cellular network may be applied to the contactless element 530 by a contactless element interface (not shown). The contactless element interface functions to permit the exchange of data and/or control instructions between the mobile device circuitry (and hence the cellular network) and the contactless element 530.

The contactless element 530 is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the mobile communication device 500 and the payment processing network 26, or it can be used to exchange data between the mobile communication device 500 and the access device 34. Thus, the mobile communication device 500 is capable of communicating and transferring data and/or control instructions via both cellular network and near field communications capability.

The mobile communication device 500 may also include a processor 540 (e.g., a microprocessor) for processing the functions of the mobile communication device 500 and a display 550 to allow the consumer to view offers associated with items that may be purchased and other information and messages. The mobile communication device 500 may further include input elements 560 to allow a user to input information into the mobile communication device 500, a speaker 570 to allow the user to hear voice communication, music, etc., and a microphone 580 to allow the user to transmit her voice through the mobile communication device 500. The mobile communication device 500 may also include an antenna 590 for wireless data transfer (e.g., data transmission).

As described above, a mobile communication device cannot conduct any transaction without the user's permission because the user must authenticate himself to the device before initiating a transaction at a merchant. The transaction information is received by the payment processing network directly from the consumer via the mobile communication device rather than from the merchant and the acquirer. The geographic locations of the merchant and the mobile communication device are identified such that if the locations correspond, the mobile communication device is authenticated and the transaction is processed.

In addition, as described above, the payment processing network may use the location information from an authenticated mobile communication device used in a previous transaction to determine whether a subsequent transaction is valid. This feature is especially useful when different payment devices are used for the different transactions. If the subsequent transaction is identified as not valid, the transaction is not processed due to the unlikelihood that the authorized consumer is conducting the subsequent transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language, such as, for example, Java, C++ or Perl, using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although GPS location techniques are described above, embodiments of the invention can use other location based techniques including the use of signal strength associated with a mobile communication device to determine proximity to a cell tower, etc.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for conducting a transaction, the method comprising:
   receiving, at a server in a payment processing network coupled with a mobile communication device held by a consumer, first location information associated with a particular location of the consumer's mobile communication device during a transaction conducted with a merchant;
   receiving, at the server, second location information associated with a particular fixed geographic location of the merchant at the time of the transaction, wherein the second location information is contained within a unique merchant identifier transferred from the merchant to the mobile communication device during the transaction, and wherein the second location information is then forwarded to the server from the mobile communication device via the payment processing network instead of from an access device operated by the merchant;
   receiving an authorization request message at the server computer;
   using the server computer, determining that a portable consumer device held by the consumer is authentic when the first location information matches the second location information; and
   using the server computer, forwarding the authorization request message to an issuer with an indicator specifying that the consumer has been authenticated or that the consumer has not been authenticated;
   wherein the first location information and the second location information are received from the mobile communication device held by the consumer, and wherein the second location information is provided to the mobile communication device directly from the access device operated by the merchant.

2. The method of claim 1 wherein the mobile communication device and the portable consumer device are the same device.

3. The method of claim 1, wherein the second location is a particular merchant location, and wherein the method further comprises:
   in the event that a subsequent transaction is initiated using a different portable consumer device at a different merchant at a different merchant location, determining that the different portable consumer device is authentic based on at least one of a distance between the particular merchant location and the different merchant location and an amount of time elapsed between the transaction at the particular merchant location and the subsequent transaction at the different merchant location.

4. The method of claim 1 further comprising:
   sending a message to the merchant indicating that the portable consumer device is authentic.

5. The method of claim 1 further comprising:
   determining that a subsequent transaction is authentic using the first location information and the second location information.

6. The method of claim 1, wherein the second location information is generated by the access device operated by the merchant, and wherein the second location information does not pass through an acquirer associated with the access device operated by the merchant.

7. The method of claim 1, wherein the server computer determines the second location information of the merchant by determining a physical address or geographic coordinates that correspond to the unique merchant identifier received in the authorization request message.

8. The method of claim 1, wherein the consumer is authenticated to the payment processing network before initiating the transaction at the merchant.

9. The method of claim 1, wherein the second location information is encrypted at the merchant using an electronic signature before it is transferred to the consumer's mobile communication device.

10. The method of claim 1, further comprising contacting the consumer to authenticate when the first location information and the second location information do not match.

11. The method of claim 1, further comprising authenticating the consumer with the mobile communication device before initiating the transaction with the merchant.

12. The method of claim 1, wherein the second location information is generated by the access device operated by the merchant, and wherein the first location information and the second location information are received at the server in the same authorization request message forwarded by the consumer's mobile communication device.

13. A method for conducting a transaction, the method comprising:
providing first location information to a server computer in a payment processing network, wherein the first location information corresponds to a location of a mobile communication device held by a consumer during a transaction conducted with a merchant;
providing second location information to the server computer, wherein the second location information corresponds to a fixed geographic location of the merchant at the time of the transaction, wherein the second location information is contained within a unique merchant identifier transferred from the merchant to the consumer's mobile communication device during the transaction and is thereafter forwarded to the server computer from the mobile communication device via the payment processing network instead of from the merchant,
wherein the server computer is configured to determine that a portable consumer device used in the transaction is authentic when the first location information matches with the second location information; and
wherein the second location information is generated by an access device operated by the merchant; and the first location information and the second location information are received from the mobile communication device, wherein the second location information is provided to the mobile communication device directly from the access device operated by the merchant, and
wherein the first and second location information do not pass through an acquirer in communication with the access device of the merchant, and
wherein the server computer forwards an authorization request message to an issuer with an indicator that it has determined that the consumer has been authenticated or that the consumer has not been authenticated.

14. The method of claim 13 wherein the first location information comprises global positioning system information associated with the mobile communication device, and wherein the second location information comprises a merchant identifier received in an authorization request message from an access device of the merchant that is conducting the transaction.

15. The method of claim 14 wherein the portable consumer device is the mobile communication device.

16. The method of claim 15 wherein the merchant identifier identifies the fixed geographic location of the merchant.

17. The method of claim 15 wherein the portable consumer device is in the form of a card.

18. The method of claim 15 wherein the server computer further performs the following:
in the event that a subsequent transaction is initiated using a different portable consumer device at a different merchant, determining that the different portable consumer device is authentic based on at least one of a distance between the particular merchant location and the different merchant location and an amount of time elapsed between the transaction and the subsequent transaction.

19. The method of claim 13 wherein the server computer further performs the following:
in the event that the first location information matches with the second location information, validating the transaction.

20. The method of claim 13, wherein the access device operated by the merchant is configured to provide the unique merchant identifier to the mobile communication device.

21. The method of claim 13, wherein the server computer determines the second location information of the merchant by determining a physical address or geographic coordinates that correspond to the unique merchant identifier received in the authorization request message.

22. The method of claim 13, wherein the consumer is authenticated to the payment processing network before initiating the transaction at the merchant.

23. The method of claim 13, wherein the second location information is encrypted at the merchant using an electronic signature before it is transferred to the consumer's mobile communication device.

24. The method of claim 13, wherein the second location information is generated by the access device operated by the merchant, and wherein the first location information and the second location information are received at the server computer in the same authorization request message forwarded by the consumer's mobile communication device.

25. The method of claim 13, wherein the second location information in the unique merchant identifier is forwarded to the server computer from the mobile communication device as evidence of interaction between the merchant and the mobile communication device.

26. A computer program product comprising a computer readable medium configured to store a plurality of instructions for controlling a processor of a server to perform an operation for conducting a transaction, the instructions comprising:
receiving, at a server computer in a payment processing network coupled with a mobile communication device held by a consumer, first location information associated with a particular location of the consumer's mobile communication device during a transaction conducted with a merchant;
receiving, at the server, second location information associated with a particular fixed geographic location corresponding to the merchant at the time of the transaction, wherein the second location information is contained within a unique merchant identifier transferred from the merchant to the mobile communication device during the transaction and is thereafter provided to the server from the mobile communication device through the payment processing network instead of from an access device operated by the merchant;
receiving an authorization request message;
using the server computer, determining that a portable consumer device held by a consumer is authentic when the first location information matches the second location information; and
forwarding the authorization request message to an issuer with an indicator, wherein the indicator specifies whether the consumer has been authenticated or that the consumer has not been authenticated;
wherein the first location information and the second location information are received at the server computer from the mobile communication device of the consumer, and wherein the second location information is provided to the mobile communication device directly from the access device operated by the merchant wherein the unique merchant identifier is sent to the server computer from the mobile communication device as evidence of interaction between the access device of the merchant and the mobile communication device.

27. The computer program product of claim 26, wherein the consumer is contacted to authenticate when the first location information and the second location information do not match.

28. A method for conducting a transaction, the method comprising:
- receiving, at a server in a payment processing network, an authorization request message including:
  - (1) first location information associated with a particular location of a mobile communication device held by a consumer conducting a transaction with a merchant; and
  - (2) second location information associated with a geographic location associated with the merchant, wherein the second location information is contained within a unique merchant identifier transferred from the merchant to the mobile communication device during the transaction, and wherein the second location information is forwarded to the server from the consumer's mobile communication device via the payment processing network instead of from an access device operated by the merchant;
- authenticating the consumer, at the server, when the first location information matches the second location information; and
- forwarding, from the server, the authorization request message to an issuer with an indicator specifying whether the consumer has been authenticated or not.

* * * * *